U S009217691B2

(12) United States Patent
Matlschweiger

(10) Patent No.: US 9,217,691 B2
(45) Date of Patent: Dec. 22, 2015

(54) SYSTEM FOR INVESTIGATING A TEST BODY

(75) Inventor: Klaus Matlschweiger, Wolfsberg (AT)

(73) Assignee: FronTone GmbH, Feldkirchen bei Graz (AT)

( * ) Notice: Subject to any disclaimer, the term of this patent is extended or adjusted under 35 U.S.C. 154(b) by 799 days.

(21) Appl. No.: 13/391,282

(22) PCT Filed: Aug. 18, 2010

(86) PCT No.: PCT/EP2010/062072
§ 371 (c)(1),
(2), (4) Date: Mar. 28, 2012

(87) PCT Pub. No.: WO2011/020868
PCT Pub. Date: Feb. 24, 2011

(65) Prior Publication Data
US 2012/0186369 A1    Jul. 26, 2012

Related U.S. Application Data

(60) Provisional application No. 61/235,132, filed on Aug. 19, 2009.

(51) Int. Cl.
*G01M 17/007* (2006.01)
*G01M 7/08* (2006.01)

(52) U.S. Cl.
CPC ............ *G01M 17/0078* (2013.01); *G01M 7/08* (2013.01)

(58) Field of Classification Search
None
See application file for complete search history.

(56) References Cited

U.S. PATENT DOCUMENTS

| 5,485,758 A * | 1/1996 | Brown et al. ................. 73/865.8 |
| 5,929,348 A | 7/1999 | Stein et al. |
| 6,035,728 A | 3/2000 | Jost |
| 6,422,058 B1 | 7/2002 | Myles et al. |
| 6,609,409 B1 | 8/2003 | Bock et al. |
| 6,675,631 B1 | 1/2004 | Steffan et al. |
| 7,216,557 B2 * | 5/2007 | David et al. ................. 73/865.9 |
| 2005/0081656 A1 * | 4/2005 | Saari et al. ................... 73/865.3 |
| 2008/0016970 A1 | 1/2008 | Klein |
| 2010/0170330 A1 * | 7/2010 | Scheepers et al. ......... 73/116.01 |
| 2011/0035162 A1 * | 2/2011 | Matlschweiger ............... 702/41 |

FOREIGN PATENT DOCUMENTS

| DE | 4222057 A1 | 1/1994 |
| DE | 10104192 A1 | 8/2002 |
| DE | 10339409 B3 | 10/2004 |
| KR | 20000060814 | * 10/2000 |
| SU | 843137 | * 6/1981 |
| WO | 2009103518 A1 | 8/2009 |

* cited by examiner

*Primary Examiner* — Robert R Raevis
(74) *Attorney, Agent, or Firm* — Robert A. Blaha; Smith Risley Tempel Santos LLC

(57) ABSTRACT

A device for investigating a test body, wherein the device comprises a mounting unit for fixedly mounting the test body during the entire investigation, an electric drive unit adapted for mechanically driving the mounting unit and the test body mounted thereon, and a control unit adapted for controlling the electric drive unit to accelerate the test body mounted on the mounting unit, wherein the device is adapted so that the mounting unit and the test body mounted thereon are mechanically driven exclusively by the electric drive unit, wherein the electric drive unit comprises an electric linear motor.

16 Claims, 7 Drawing Sheets

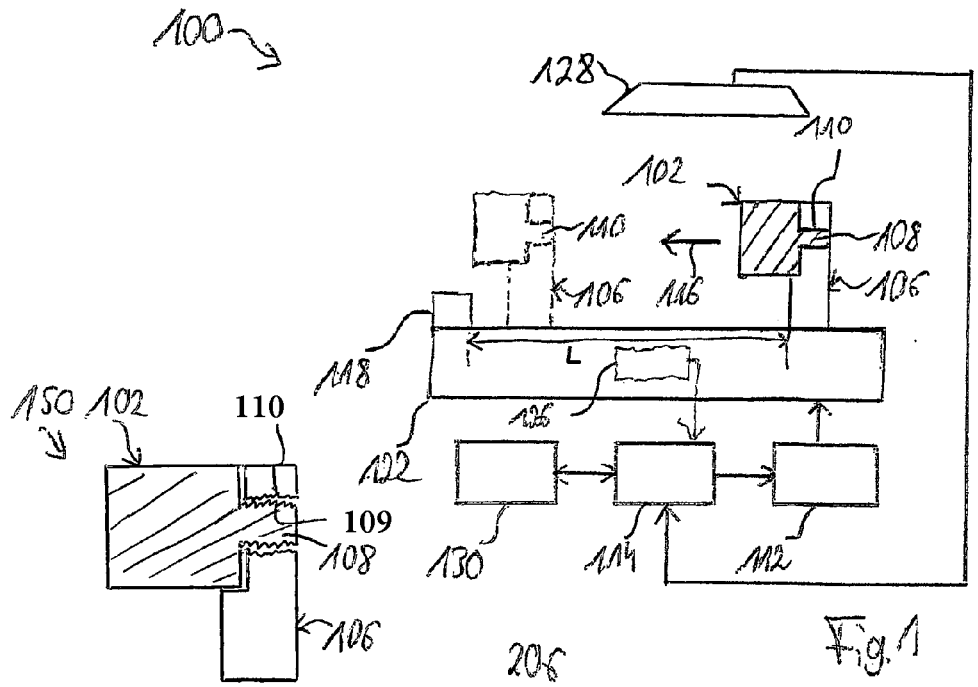
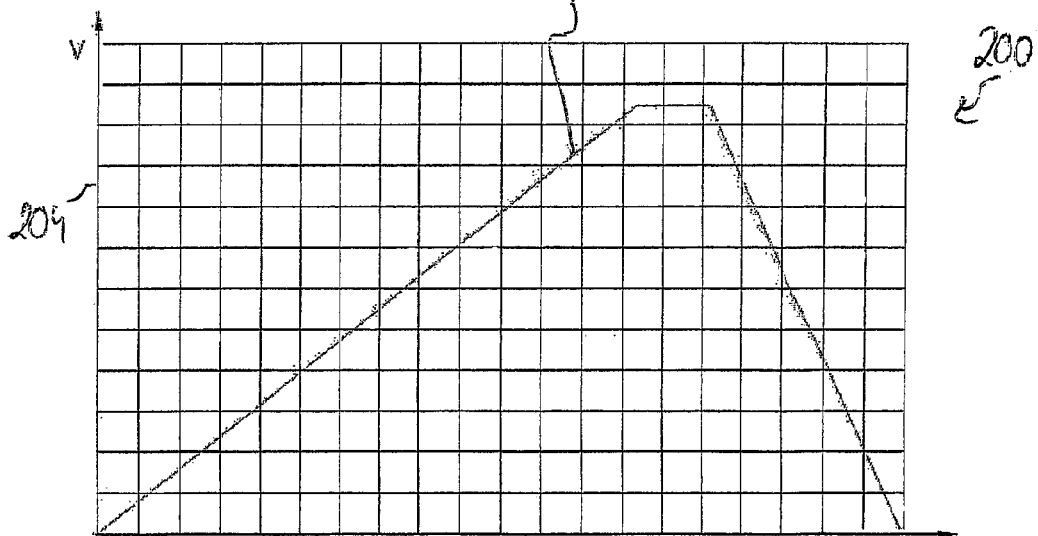
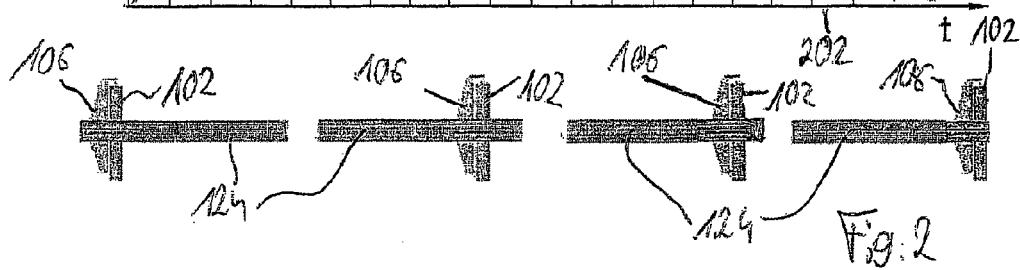

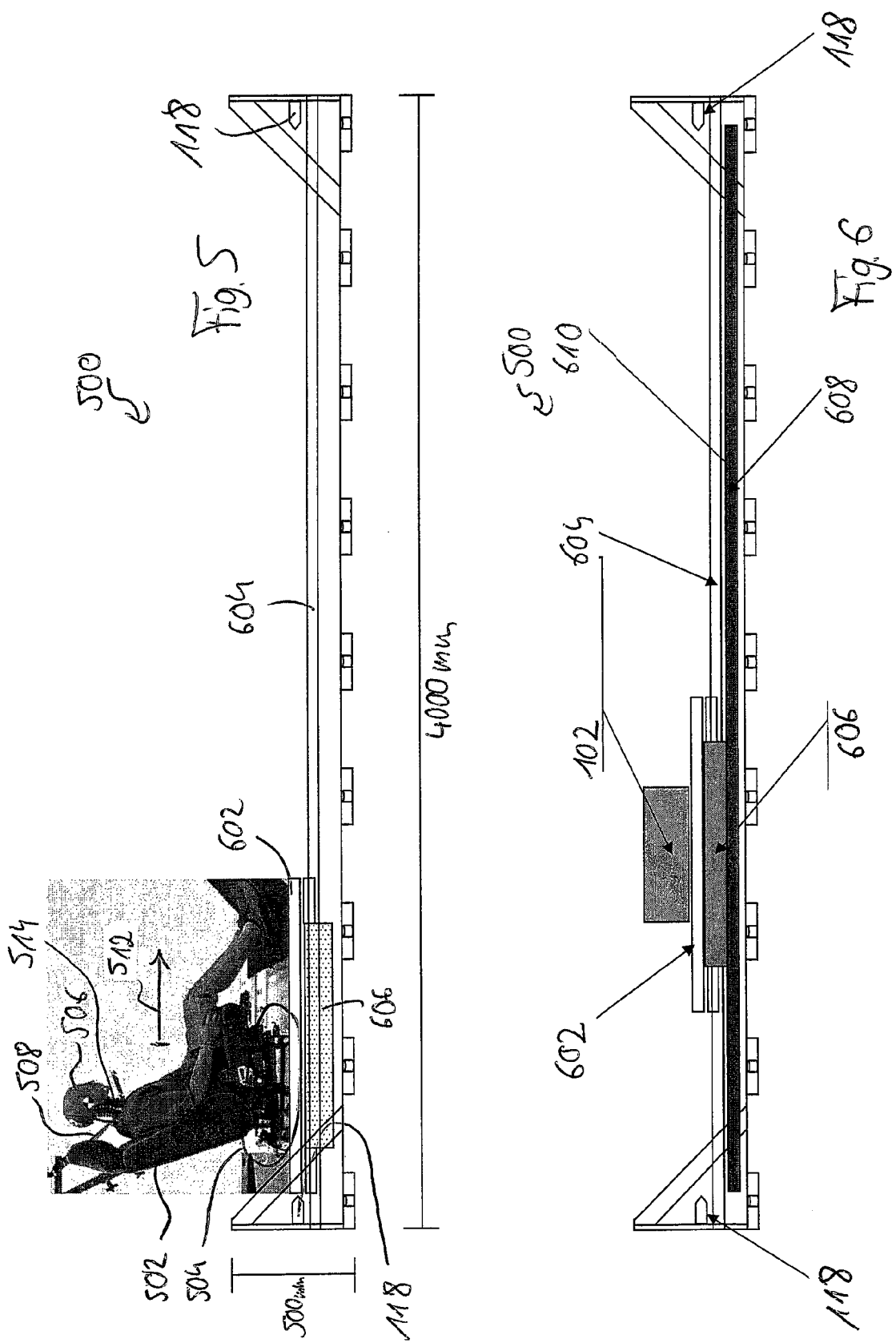

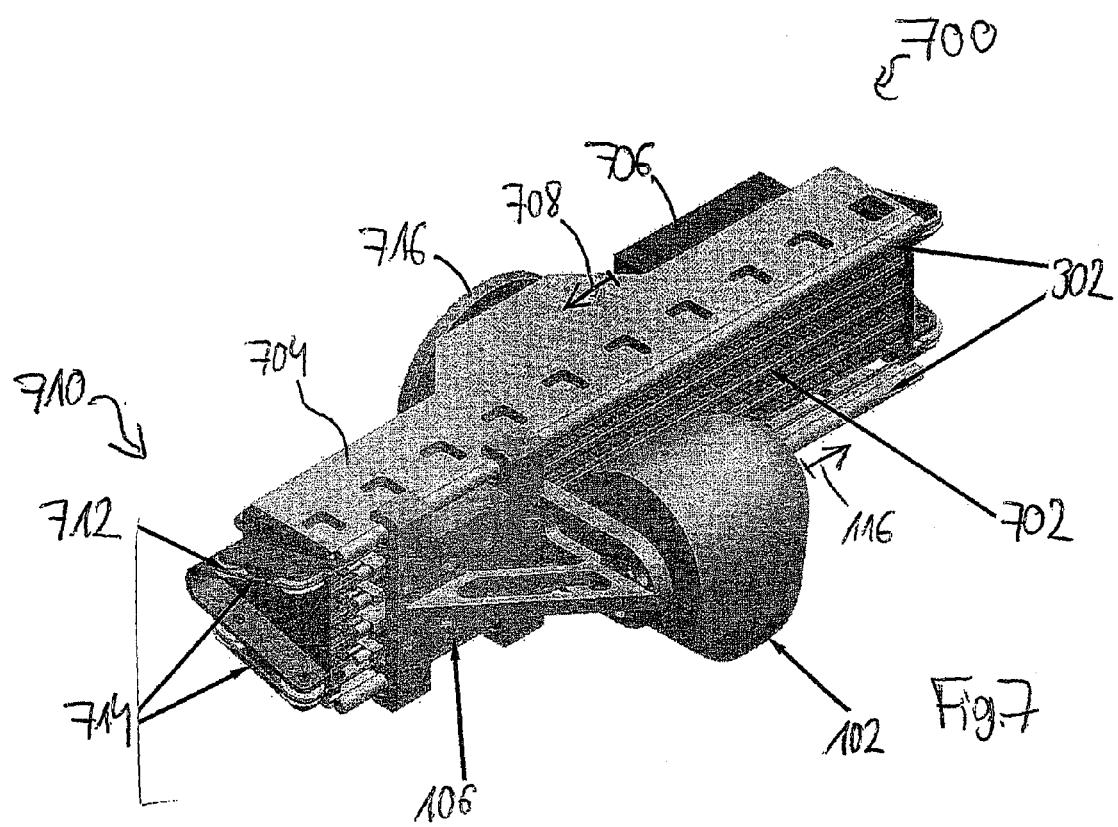
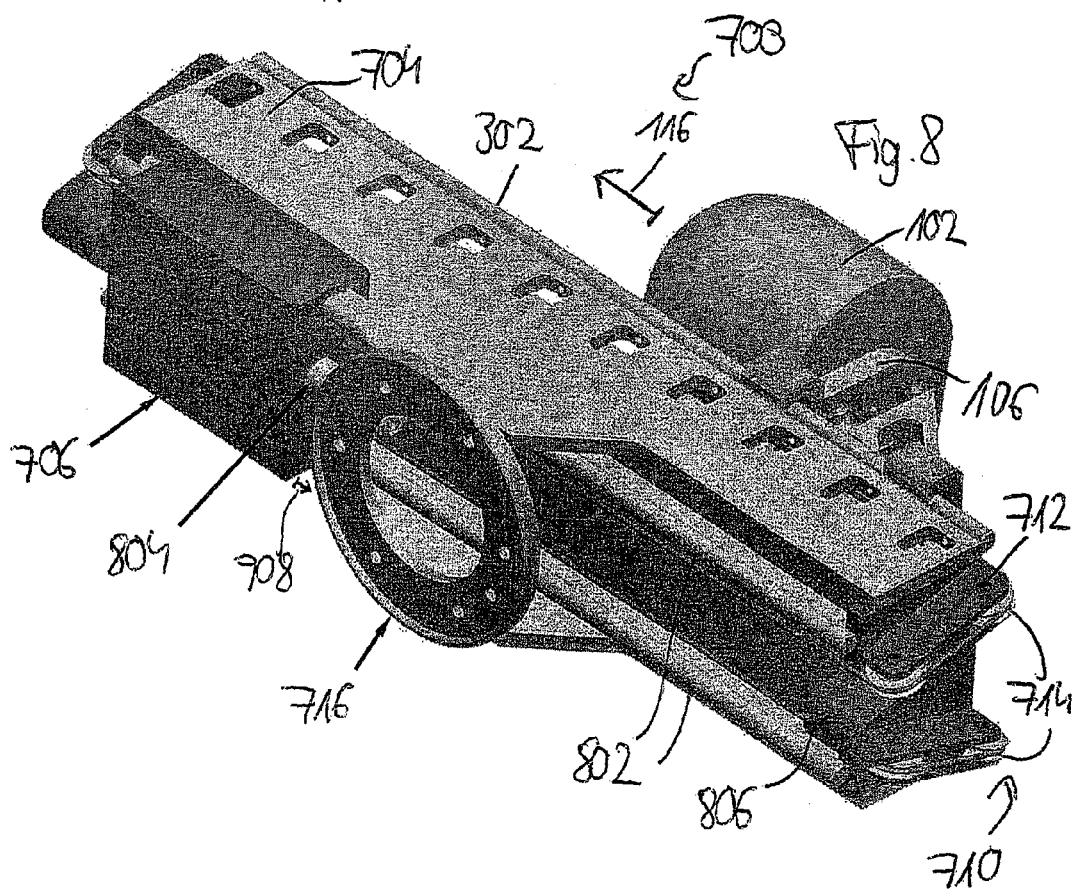

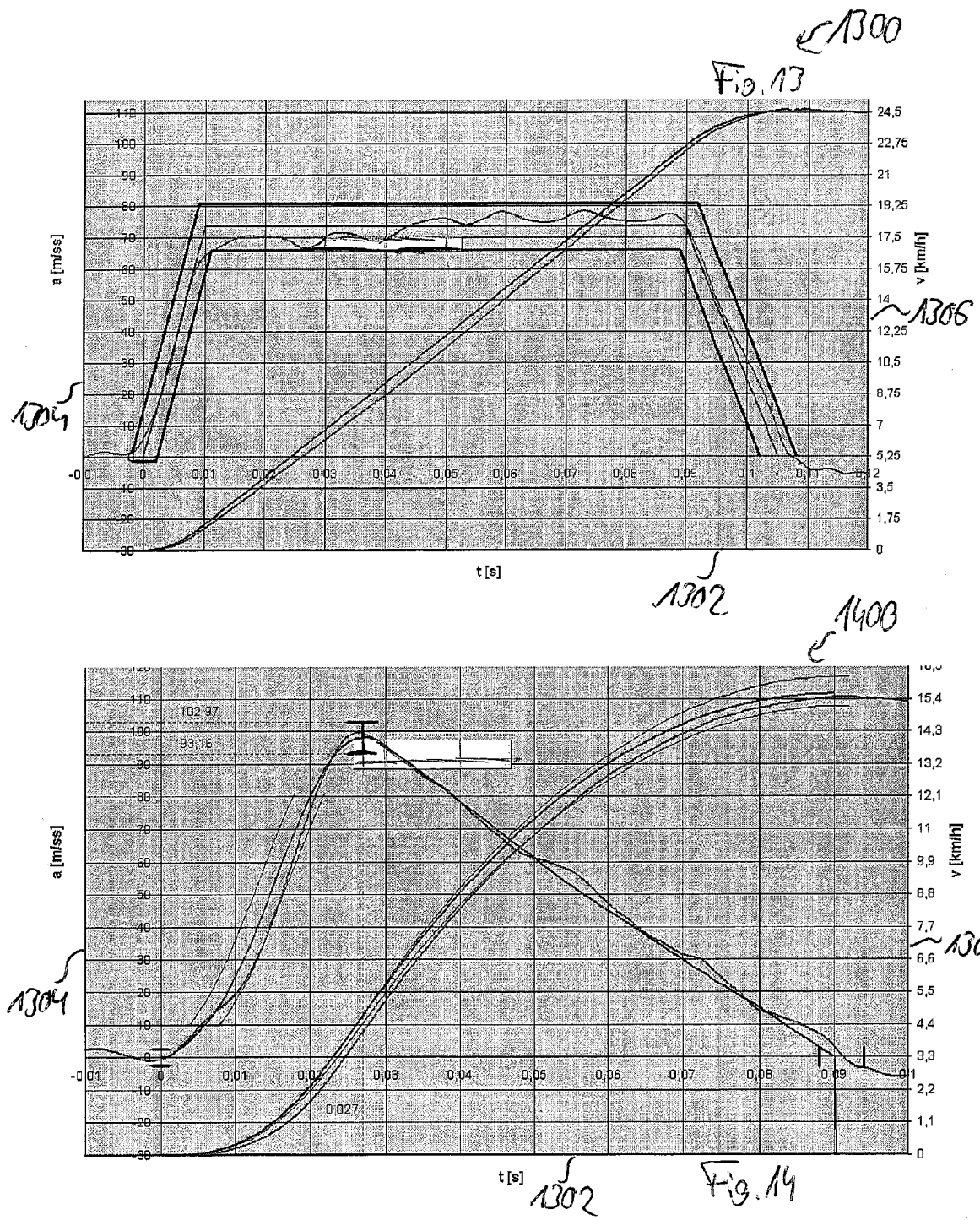

SYSTEM FOR INVESTIGATING A TEST BODY

TECHNICAL FIELD

The invention relates to a device for investigating a test body.

Beyond this, the invention relates to a method of investigating a test body.

Moreover, the invention relates to a program element. Furthermore, the invention relates to a computer-readable medium.

BACKGROUND

Physical tests for simulating a crash between a vehicle and pedestrians or a vehicle and its occupants are a powerful tool for developing improvements of technical devices and may be helpful in product development and failure analysis. Other investigations, without necessarily performing a crash between two components, may relate to the determination of a behaviour of a component experiencing a time dependent force load.

Various legal and industrial regulations exist which need to be fulfilled in order to accept a vehicle as sufficiently safe. Examples are FMVSS, IIHS, Whiplash IIWPG, ECE-Regulations, or Euro-, US-, Japan-NCAP. Directive Whiplash IIWPG, for instance, regards the protection for vehicle occupants in case of a collision of the vehicle with an obstacle. Whiplash and whiplash-associated disorders (WAD) represent a range of injuries to the neck caused by or related to a sudden distortion of the neck.

DE 103 39 409 discloses a shooting device for accelerating a test body under pre-selected conditions against a fixed object, which is part of a vehicle, in an acceleration direction. The test body has a linear moving carrier on which it is held using a mounting. The carrier is linked with the inductor cam of a linear motor to permit control of its firing velocity. The cam moves along a reaction bar that is parallel to the carrier guide.

DE 101 04 192 discloses a holder which holds a test body. The holder is provided with a carrier which can be accelerated. The carrier can be selectively operated in either a free-flight mode or a guided mode. At least part of the accelerated carrier carrying the holder is movable in the guided mode until the test body collides with the object, and can be braked in the free-flight mode prior to the collision.

U.S. Pat. No. 6,609,409 discloses an impact test stand for vehicle components, such as interior parts, operating parts and components of an occupant restraint system includes a stationary frame and an impact body. The impact body is mounted on a carriage. The carriage is guided by a guide track and driven by a linear drive. By accelerating the carriage, the impact body is driven against the component to be tested.

U.S. Pat. No. 6,675,631 discloses a method of conducting crash tests uses a crash-test carriage. The crash-test carriage is accelerated in accordance with a real deceleration curve to thereby simulate deceleration forces associated with a real collision, the crash-test carriage having a carriage drive apparatus associated therewith. The method includes the step of exerting an accelerating force on the crash-test carriage in an acceleration direction, the accelerating force exceeding a respective force required for acceleration in accordance with the real deceleration curve. The method also includes a step of exerting a braking force on the crash-test carriage in a direction opposite the acceleration direction in order to achieve a desired acceleration curve. The braking force is applied on one of the crash-test carriage and the carriage drive apparatus, the braking force being so large so as to accelerate the crash-test carriage in accordance with the desired acceleration curve.

U.S. Pat. No. 5,929,348 discloses an apparatus for dynamic testing by rapidly accelerating a test specimen which includes a sled carriage slidably mounted on first and second elevated horizontal tracks attached to a fixed foundation for free movement of the sled carriage along the tracks from a first to a second track location. The sled carriage has an essentially horizontal mounting plate terminating in a leading edge at one end and a trailing edge at an opposite end, and impact block mounted to the bottom surface of the mounting place intermediate the leading and trailing edges. A pressure differential firing component has a moveable thrust surface for striking the impact block, the pressure differential firing component being attached to the foundation between the tracks so at least a portion of the bottom surface of the mounting plate of the sled carriage between the leading edge and the impact block can override at least a portion of a firing chamber component of the pressure differential firing component. A high pressure compressed gas storage chamber is attached to the foundation between the tracks in a position substantially parallel to the firing chamber, and manifold component fluidly connecting the gas storage chamber with the firing chamber whereby, upon actuation of a trigger component. Gas in the gas chamber causes the thrust surface to strike the impact block whereby longitudinal movement is imparted to the sled carriage to cause propelled movement of the sled carriage from the first to the second track location.

U.S. Pat. No. 6,035,728 discloses a test rig for impact testing on vehicles which comprises a platform for mounting a vehicle seat and test dummy and an array of individually selectively controllable actuators, in close proximity to the platform. The actuators are extendible towards the platform by individually determinable velocities. Control loops and microprocessors assist the control. In this way a more accurate and versatile simulation is possible of anyone of a variety of crash situations including pole impacts. Vehicle characteristics can be simulated without the need to use expensive actual vehicle parts.

However, conventional test systems may be inaccurate, time consuming or inconvenient in use.

SUMMARY

It is an object of the invention to provide a test system which provides for a sufficiently fast and accurate data accumulation and which is operable conveniently by a user.

In order to achieve the object defined above, a device for investigating a test body, a method of investigating a test body, a program element, and a computer-readable medium according to the independent claims are provided.

According to an exemplary embodiment of the invention, a device for investigating a test body is provided, wherein the device comprises a mounting unit for fixedly mounting the test body (for instance, corresponding provisions may be made at the mounting unit and at the test body allowing to mount the test body sufficiently firm to guarantee that the test body follows a motion of the mounting unit to prevent that the test body is separated from the mounting unit during deceleration during the investigation; such a fixation may be adapted for allowing to control the test body to move along a guided trajectory defined by a controlled motion of the mounting unit, in contrast to a free-flight mode), an electric drive unit adapted for mechanically driving the mounting unit and the test body mounted thereon during the entire investigation, and a control unit adapted for controlling the electric drive unit to accelerate the test body mounted on the mounting unit. The device may be adapted so that the mounting unit and the test body mounted thereon are mechanically driven exclusively by the electric drive unit, wherein the electric drive unit comprises an electric linear motor.

According to another exemplary embodiment of the invention, a method of investigating a test body is provided, wherein the method comprises mechanically driving a mounting unit and a test body fixedly mounted thereon during the entire investigation exclusively by an electric drive unit, wherein the electric drive unit comprises an electric linear motor, and controlling the electric drive unit to accelerate the test body mounted on the mounting unit.

According to yet another exemplary embodiment of the invention, a computer-readable medium (for instance a CD, a DVD, a USB stick, a floppy disk or a harddisk) is provided, in which a computer program of investigating a test body is stored which, when being executed by a processor, is adapted to control or carry out a method having the above mentioned features.

According to still another exemplary embodiment of the invention, a program element (for instance a software routine, in source code or in executable code) of investigating a test body is provided, which program element, when being executed by a processor, is adapted to control or carry out a method having the above mentioned features.

Data processing for test purposes which may be performed according to embodiments of the invention can be realized by a computer program, that is by software, or by using one or more special electronic optimization circuits, that is in hardware, or in hybrid form, that is by means of software components and hardware components.

The term "test body" may particularly denote any object (particularly any technical apparatus, member, or a portion thereof) in the real world which may be under development or analysis and shall therefore be investigated by a test. Thus, during the analysis, a physical property or a behaviour of the test body may be investigated. Such a test body may be a vehicle, particularly a car, or a vehicle component, particularly a passenger seat, which may require to pass certification tests to be approved or to meet industrial or legal standards regarding quality or safety. Embodiments of the invention may relate to the field of interior protection of occupants in a vehicle, for instance in view of safety in case of a crash. Embodiments of the invention may be configured to allow for an investigation in accordance with the Directive Whiplash IIWPG. This directive regards the protection for vehicle occupants in case of a collision of the vehicle with an obstacle.

The term "electric drive unit" may particularly denote any electric motor which directly generates a force directly exerted on the mounting unit and, in turn, on a test body mounted on the mounting unit, particularly without interconnecting or interposing a hydraulic or pneumatic force generator between drive unit and mounting unit. Thus, the device may be free of a hydraulic or pneumatic component. Hence, such an electric drive unit may be an engine for doing work using electricity, or a motor that converts electricity (preferably directly) to mechanical work.

The term "mounting unit for fixedly mounting the test body during the entire investigation" may particularly denote that the mounting unit is structurally configured to ensure that the mounted test body remains fixedly fastened at the mounting unit during the entire acceleration and deceleration phase. Particularly, the system may be configured to inhibit undesired release of the test body from the mounting unit during operating the system. For instance, the fixation of the test body on the mounting unit may be stronger than all forces acting on the test body during the investigation. For example, the fixation may be a permanent one which may require an action of a user to disassemble the test body from the mounting unit. The mounting unit may hence be adapted for maintaining the test body fixed to the mounting unit during the entire acceleration and deceleration phase until the mounting unit and the test body secured thereto stops or stands still. Hence, only after finishing the investigation and only when a user performs a disassembling operation, the test body may be separated from the mounting unit. The fixation between mounting unit and test body may be so rigid that during the entire investigation a trajectory of the test body follows a trajectory of the mounting unit. The mounting unit and the test body perform joint or mutual motion until both have come to rest. Then, a specific action following the investigation may allow to disassemble the test body from the mounting unit. A defined acceleration/deceleration pattern may be externally applied to the test body during the entire investigation in contrast to a free-flight mode during which control of the test body is lost when the test body is released from the mounting unit for colliding with another physical structure. In contrast to this, an embodiment of the invention may maintain control over the acceleration/deceleration characteristic of the test body even during a collision of the test body with a physical structure during which the test body maintains fixedly connected to the mounting unit.

According to an exemplary embodiment of the invention, a test body is not shot against a vehicle structure, but a vehicle structure or a vehicle component can be moved using predefined pulses (or an acceleration pattern over time) to remain fixedly connected to a mounting unit of the device. Such a device may be driven exclusively electrically, particularly exclusively using one or more electric linear motors. A horizontal carriage may be rigidly coupled with a drive using one or more electric linear motors). Such a connection may be direct, so that an acceleration of the horizontal carriage does not have to use a piston rod, etc. Such a purely electric drive in contrast to conventional hydraulic or pneumatic arrangements does not require a long preparation time for filling a pressure cylinder before carrying out an experiment, so that a device according to an exemplary embodiment is usable again directly after having performed an investigation or experiment. Such a device may operate in a low speed region (0.01 km/h) or in a high speed range. There is basically no limitation regarding a possible motion distance along which the velocity or acceleration profile may be defined, so that an acceleration/deceleration length of 800 mm or more is possible. In an embodiment, such an acceleration/deceleration length may be in a range between 10 mm and 12000 mm. However, it is also possible to perform positioning adjustments with an accuracy of micrometers or less. Corresponding horizontal carriages may be used for sensor tests, etc. Exemplary embodiments of the invention may be used for crash simulation tests in the automotive field, but may also perform any positional tasks in vehicle/surrounding sensoric tests.

By keeping the test body rigidly coupled to the mounting unit during the entire investigation (i.e. before beginning to accelerate test body and mounting unit, during a subsequent acceleration of test body and mounting unit, during a subsequent deceleration of test body and mounting unit until both test body and mounting unit come to rest or grind to a halt, optionally also during an optional collision between the test body—still being mounted on the mounting unit—and a physical structure), the test body may follow a motion of the mounting unit over the entire investigation in a guided manner. This may allow to perform a test of the test body in accordance with regulations requiring to perform test procedures without free-flying test bodies. Furthermore, the degree of control over the test may be significantly higher in such a guided mode as compared to a free-flight mode. Implementing the drive exclusively on the basis of a linear drive may allow to obtain a superior control of the test body during the entire experimental investigation procedure.

Thus, an electrically driven test bench or testing station may be provided for improving the reliability of a vehicle safety test. By taking this measure, a controlled or regulated velocity pattern may be achieved without the necessity to define a test matrix or to perform comparison tests. The test and the results may be more precise and may be essentially independent of the environmental temperature. It may be possible to make the test procedure faster and to reduce the times required for changeover or recalibration of the system. The operation safety may be very high and the operation may be user-convenient and may involve only a very small effort for maintenance.

Next, further exemplary embodiments of the device will be explained. However, these embodiments also apply to the method, to the program element and to the computer-readable medium. The mounting unit may be adapted for unreleasably fixing the test body to the mounting unit. The term "unreleasably fixing" may particularly denote that a nondestructive separation of the two components is only possible by disassembling the components from one another. Mounting unit and test body may be rigidly coupled to one another along the complete motion trajectory. In other words, the fixation may be inseparable or permanent during the acceleration and deceleration cycle and may maintain the mounting unit fixed to the test body during the entire investigation.

The mounting unit may be adapted for enabling release of the test body from the mounting unit only upon operation of a user-operated tool by a user in a resting or stationary operation state. Thus, a tool such as a screwdriver may be required for releasing the test body from the mounting unit.

The control unit may be adapted for controlling the electric drive unit to limit a maximum acceleration or deceleration of the test body mounted on the mounting unit to an absolute value below a predefined acceleration or deceleration threshold value. In other words, provisions may be taken at the control unit to prevent application of too high absolute acceleration/deceleration values to the test body rigidly mounted on the mounting unit which too high acceleration/deceleration could cause destructive undesired release of the test body from the mounting unit (for instance by damaging of a rigid coupling of test body to mounting unit, such as destruction of a screw connection or breakage of a clamp connection). In an embodiment, such a predefined acceleration or deceleration threshold value may be smaller than about 900 m/s$^2$, particularly smaller than about 700 m/s$^2$, more particularly smaller than about 500 m/s$^2$. Taking this measure may ensure that any undesired release of the test body from the mounting unit may be safely prevented.

Additionally or alternatively, the control unit may be adapted for controlling the electric drive unit to limit a maximum acceleration force or deceleration force of the test body mounted on the mounting unit to an absolute value below a predefined force threshold value. The predefined force threshold value may be smaller than about 150000 kg m/s$^2$, particularly smaller than about 120000 kg m/s$^2$, more particularly smaller than about 90000 kg m/s$^2$.

It is possible to provide the mounting unit with one or more sensors such as velocity sensors, acceleration sensors, force sensors, etc. Since in an embodiment, the mounting unit remains fastened to the test body during the entire investigation (including a possible collision of the test body with a physical structure) such sensors attached to the mounting unit may provide information indicative of a performance of the test body during the investigation.

The fixation of mounting unit and test body may be a form closure fixation (for instance a snap-in connection, tongue and groove connection, a dove tail connection), a force closure fixation (for instance clamping, pressing), or a fixation by material connection (for instance gluing or welding).

A length of the device along which the mounting unit may be moved may be larger than about 800 mm, particularly larger than about 1000 mm, more larger than about 2000 mm. For example, a guide rail along which the mounting unit with the test body fixedly mounted thereon may be moved for performing the investigation—or for applying a given velocity curve—may be larger than 800 mm or even larger than 1000 mm or even larger than 2000 mm. In an embodiment, a total length of the device (in the direction with the largest extension) may be at least 2000 mm, for instance 4000 mm. Particularly, a linear trajectory of mounting unit and test body fixedly mounted thereto during mutual motion driven by the drive unit may be at least 800 mm.

The control unit may be adapted for controlling a whiplash test. In such a test, a crash test dummy simulating a human being may be fastened to a passenger seat (or a similar component) as the test body. An acceleration sequence may be applied to the test body simulating forces typically acting on a passenger during a crash of two vehicles. An analysis unit may then be adapted for detecting and evaluating test data to determine whiplash-related output information. Such information determined by analyzing a behaviour of the crash test dummy during the investigation may then be indicative of a possible whiplash of a human passenger sitting on the passenger seat during an accident simulated by the investigation.

The device may be adapted so that the mounting unit and the test body mounted thereon are mechanically driven exclusively by the electric drive unit. In other words, a purely electric drive mechanism may be implemented. No non-electric drive mechanism are implemented in such an embodiment. The entire drive energy or drive power for moving the mounting unit may be provided by the electric drive mechanism in such an embodiment. In such an embodiment, the drive mechanism may be free of any non-electric drive components, particularly may be free of any pneumatic drive component. The mechanical drive mechanism for mechanically driving the mounting unit and the test body mounted thereon may consist of an electric drive unit. By such a measure, it may be dispensible to implement complex and expensive pneumatic drive systems. In an embodiment, all energy required for a coarse and a fine control of a sequence of phases with different acceleration characteristics may be provided by an electric drive unit which may have one or more linear motors.

The mounting unit may be adapted for mounting a test body which may be an automotive structure, a test body simulating a vehicle, a test body simulating a component of a vehicle, a test body simulating a road vehicle, a test body simulating a component of a road vehicle, a test body simulating a railway vehicle, a test body simulating a component of a railway vehicle, a test body simulating an aircraft, or a test body simulating a component of an aircraft.

It is also possible that the test body is a crash test dummy, i.e. a body simulating a human being with regard to its response to mechanical forces. Such an embodiment may be implemented in the context of dummy calibration. For this purpose, a dummy may be placed on the mounting unit and may be accelerated in accordance with a defined acceleration profile. An inspection of the resulting performance of the dummy (for instance a comparison of actual values with target values) may then allow to accept or reject the dummy.

In still another embodiment, the test body may be a living human being or a dead human being. In such an embodiment, the mounting unit may be a seat, and the human being may be simply placed on the seat or may be fastened at the seat (for example by a seat belt). Testing with a human test body may be helpful in the development of vehicles for public transportation.

The device may further comprise one or more of the previously mentioned test bodies which may be specifically adapted to correspond to respective fastening provisions at the mounting unit for mounting the test body for example in a form locking manner. The mounting of a test body at the mounting unit may be so that upon exertion of any forces which may be exerted during the controlled investigation, the test body follows the motion of the mounting unit and is never released from the mounting unit due to any acceleration or deceleration.

The mounting unit and the test body are firmly fixed to one another during both the acceleration phase and the deceleration phase. Release of the test body from the mounting unit may be strictly inhibited.

The mounting unit may be adapted for substitutably/detachably mounting different test bodies. Thus, a kit or construction set may be provided comprising different test bodies and one mounting unit which is configured for mounting each individual one of the test bodies, one at a time. Therefore, different tests may be carried out one after the other with the different test bodies using the same mounting unit. It is also possible to provide a plurality of mounting units adjusted to different ones of the test bodies.

The electric drive unit may comprise an electric linear motor. A linear motor may be a multiphase alternating current (AC) electric motor that has had its stator "unrolled" so that instead of producing a torque (rotation), it produces a linear force along its length. One mode of operation is a Lorenz type actuator in which the applied force is linearly proportional to the current and the magnetic field. Such a linear motor, for instance a high acceleration linear motor, may be relatively short and may be designed to accelerate an object up to a high speed and then release the object. When implementing an electric linear motor in the collision simulation device, a high accuracy may be achieved.

The electric linear motor may comprise a primary part arranged at a static support of the device and may comprise a secondary part arranged at the mounting unit to be movable relative to the static support. Thus, the electric linear motor may act directly on the mounting unit without interconnecting interlinks such as force transforming elements (like ropes, pulleys, etc.).

The control unit may be adapted for controlling the electric drive unit to accelerate the test body in accordance with a predefined velocity profile (or in accordance with a predefined acceleration profile). A large variety of different velocity profiles may be defined by a user so as to allow to operate the device in accordance with user preferences.

Particularly, the control unit may be adapted for controlling the electric drive unit to accelerate the test body in accordance with a predefined trapezoidal velocity profile (which may have a slowly rising edge followed by a plateau followed by a fast falling edge). Such a profile is shown, for instance, in FIG. 2. A trapezoidal velocity profile may start with a linearly increasing velocity, followed by a plateau in which the velocity is constant over time, then followed by a linear reduction of the velocity which may have a slope being higher than the slope in the rising part of the trapezoidal velocity profile. Such a profile may allow for a proper acceleration scheme to define accurate conditions up to a state in which the test body being in permanent fixation with the mounting unit comes to rest.

The device may comprise a stator or support on which the mounting unit is movable along a predefined trajectory. Such a support may be a table or any other substrate which may be assembled statically in an essentially vibration-free manner and which defines a (for instance linear) trajectory along which the accelerated mounting unit is moved.

Particularly, the support may comprise a guide rail along which the mounting unit may be movable to follow the predefined trajectory. Thus, the mounting unit may be guided in a slidable manner along the guide rail which thereby defines the motion direction very accurately.

The device may comprise a measurement unit adapted for measuring data indicative of a motion of the test body mounted on the mounting unit and for supplying the measurement data to the control unit as a basis for controlling the electric drive unit. Particularly, the measurement unit may perform a longimetry measurement of the test body mounted on the mounting unit. When corresponding data sets (parameter pairs of time and position) are reported to the control unit, the control unit may verify or monitor whether the present motion characteristic is appropriate or whether a modification of the regulation is necessary.

The device may comprise an analysis unit adapted for detecting and evaluating data indicative of a behaviour of the test body. Such an analysis unit may comprise a camera for capturing images or a video of the test body for subsequent evaluation. It is further possible that such an analysis unit comprises one or more sensors positioned at or in the test body and/or the mounting unit which allows to measure parameters characterizing the behaviour of the test body.

The electric drive unit may comprise a plurality of electric linear motors to be operated parallel (timely and/or spatially) to one another and in a synchronized manner. It has been surprisingly recognized that, for specific high power test experiments, it might be insufficient to use only a single electric linear motor to obtain the required high power values. Therefore, it is possible to provide a multitude of electric linear motors, for example three, four or more, the operation of which are to be synchronized so as to obtain a sufficiently powerful acceleration of the test body. Particularly, the acceleration force provided by such an electric drive unit may be at least 1000 N, particularly may be at least 1500 N, more particularly may be at least 2000 N. A force of such a magnitude may be provided by a plurality of linear motors together. Particularly, a software routine for controlling the electric linear motors may be particularly specified so as to synchronize properly the acceleration contributions of the individual linear motors. Such a software routine may be configured to enable a switching of the individual linear motors parallel in time. The linear motors may be connected in series. In contrast to conventional approaches, the entire acceleration power or energy may be provided by the electric drive unit according to an exemplary embodiment of the invention.

In an embodiment, the control unit may be adapted for controlling the electric drive unit to accelerate the test body during a first time interval, to regulate a constant velocity of the test body during a second time interval succeeding the first time interval, and to decelerate the test body during a third time interval succeeding the second time interval. During the first time interval, the velocity of the test body may be increased, during the second time interval the velocity of the test body may be maintained at a desired target value, and during the third time interval, a negative acceleration may be impacted on the test body to thereby brake the mounting unit. The fixed structural mounting provisions taken at the mounting unit and/or at the test body may be such that even during braking, the mounting unit and the test body remain firmly connected. Consequently, the test body is not released from the mounting unit during such a braking.

The control unit may be adapted for controlling the electric drive unit to accelerate and subsequently decelerate the test body mounted on the mounting unit. The control unit may prevent the test body from releasing the mounting unit during accelerating and decelerating. For instance, the control unit may provide a fastening force to fasten the test body to the mounting unit and may prevent deactivation of the fastening force until the test body and the mounting unit have come to a standstill.

The test body may be fastened to the mounting unit in such a manner that a fasting force is constant over the entire investigation, i.e. is at least constant in a time interval at the beginning of which the test body and the mounting unit stand still before starting the investigation and at the end of which the test body and the mounting unit again stand still after finishing the investigation.

In an embodiment, the device may be adapted so that, exclusively by the electric drive unit, the mounting unit and the test body mounted thereon are accelerated during the first time interval, moved with the constant velocity during the second time interval and decelerated during the third time interval. Therefore, all three cycles of an acceleration-forceless operation-deceleration sequence may be powered only by the electric drive unit alone which therefore acts as the only power supply for adjusting velocity of mounting unit/test body. In an embodiment, exclusively linear motors are employed for accelerating ($a>0$), regulating the velocity and decelerating ($a<0$). No pneumatic and hydraulic components are necessary in such embodiments.

In an embodiment, a counterweight may be provided at the device which may be configured to be mechanically driven (for instance only) upon mechanically driving the mounting unit and the test body mounted thereon along a moving direction being oppositely oriented with regard to the moving direction of the mounting unit and the test body mounted thereon. In other words, the counterweight may compensate mechanical forces acting on the device upon accelerating mounting unit and test body along one direction. When moving the counterweight in an opposite direction, a balancing of such forces on the device may be achieved so that the device can be operated smoothly. Such a counterweight is particularly advantageous when the mounting unit and the test body are arranged at a lateral side surface of the device. In such a scenario, it may be advantageous to arrange the counterweight at an opposing side surface of the device. When the mounting unit moves in a forward direction, the balance weight would move in a backward direction, and vice versa. In other words, a motion of both the mounting unit and the counterweight may be executed along a longitudinal extension of the (for instance oblong) device. Projected on this longitudinal axis, the mounting unit may move from a first position (starting position of the mounting unit) to a second position (destination position of the mounting unit), whereas the counterweight may move simultaneously from the second position (starting position of the counterweight) to the first position (destination position of the counterweight). With such a configuration, a spatially compact device may be obtained which can be operated without disturbing shaking or oscillating due to uncompensated forces.

A mass of the counterweight may equal or may be identical to a mass of the test body (considering the mass of the mounting unit). In other words, the counterweight may be configured to have a mass which balances out mechanical loads acting on the device as a consequence of the moving test unit/mounting unit.

The device may comprise a force converter mechanically coupling the counterweight with the mounting unit and the test body mounted thereon so that the force converter converts a force acting on the mounting unit and the test body mounted thereon to a converted force acting on the counterweight. Due to a corresponding motion coupling of the mounting unit and the counterweight, it is possible to move both the mounting unit and the counterweight by one and the same drive, i.e. by the electric drive unit. Therefore, it may be dispensable to use any additional drive for driving the counterweight. This allows for a compact device, and also eliminates any synchronizing effort for synchronizing motion of the counterweight and the mounting unit, because this is achieved automatically.

Particularly, the force converter may comprise a cable pull mechanism having a cable connecting the counterweight with a mounting unit to reverse a force vector acting on the mounting unit and the test body mounted thereon into an inverse force vector acting on the counterweight. Such a cable pull mechanism is a very simple mechanism for inverting the direction of a force and allows for a compact construction of the device together with a very reliable force transformation.

The stator of the device carrying the guide rail on which the mounting unit can move may further comprise a further guide rail on which the counterweight is movable along a predefined further trajectory. The two guide rails may be parallel to one another and the two trajectories may be antiparallel to one another, and spatially displaced by a distance equalling to the transversal dimension of the stator. Such a configuration allows for a safe guide mechanism for guiding both the counterweight and the mounting unit so as to properly compensate any forces.

Moreover, the device may comprise a robot mounting base adapted for mounting a robot for spatially moving the device. In other words, an adaptor may be provided such as a flange at which a robot may be mounted with the device. Mounting the device on the robot may be advantageous since the robot may move the device freely in space to a destination position at which a test experiment is to be carried out. However, such robots are very prone to failure when a component mounted thereon tends to oscillate or exerts uncompensated forces on the robot. Therefore, the configuration with the robot mounting base is particularly advantageous in combination with the provision of a counterweight which can ensure that a force free acceleration experiment is carried out without a disturbing impact on a robot assembled with the device. This allows for a proper spatial resolution of an experiment and allows to use even simple robots thereby reducing costs.

The device may comprise a user interface for enabling a user to bidirectionally communicate with the device. Thus, the user may supply the device via the user interface with control demands via input elements such as a keypad, a joystick, or the like. Furthermore, results of the investigation may be displayed to a user on a display unit of the user interface, for instance a liquid crystal display (LCD) unit or the like.

Particularly, embodiments of the invention may be advantageously applied in the context of the simulation of a crash of the controlled test body and a physical structure, for instance a crash of a vehicle, like an automobile, with a pedestrian or its occupant.

Another field of application of exemplary embodiments of the invention is a simulation or test of integrity of operation of the test body. More generally, embodiments of the invention may be applied to any material test in structural mechanics. Results from the test may be analyzed under consideration of finite element (FE) calculations which may deliver complementary information.

For instance, the test body may be a vehicle seat such as a driver seat, a co-driver seat, a child car seat, etc. In an embodiment, provisions made at the vehicle seat for fastening such a seat in a passenger cell of a vehicle may be used for fastening the vehicle seat at the mounting unit. Additionally or alternatively, separate fastening elements may be formed at such a vehicle seat for rigidly coupling the test body to the mounting unit. In an embodiment, a crash test dummy may be seated on such a vehicle seat fixedly fastened at the mounting unit. The crash test dummy may, in turn, be fastened at a fasting belt or the like of the vehicle seat which is, in real life, provided for fastening a passenger. Then, properties of the vehicle seat may be tested by performing an acceleration/deceleration pattern with the mounting unit and therefore also with the vehicle seat fastened thereto. Analyzing a behaviour of the vehicle seat and/or of the crash test dummy during the investigation may therefore allow to obtain information indicative of the safety of such a vehicle seat.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

FIG. 1 illustrates a device for investigating a test body according to an exemplary embodiment of the invention.

FIG. 2 shows a velocity profile of a mounting unit and a test body during operation of a device for investigating a test body according to an exemplary embodiment of the invention.

FIG. 5 and FIG. 6 illustrate a device for investigating a test body according to an exemplary embodiment of the invention.

FIG. 7 and FIG. 8 show two three-dimensional views of a device for investigating a test body according to another exemplary embodiment of the invention.

FIG. 13 and FIG. 14 show velocity profiles of a mounting unit and a test body during operation of a device for investigating a test body according to an exemplary embodiment of the invention.

DESCRIPTION OF EMBODIMENTS

Figure 3:
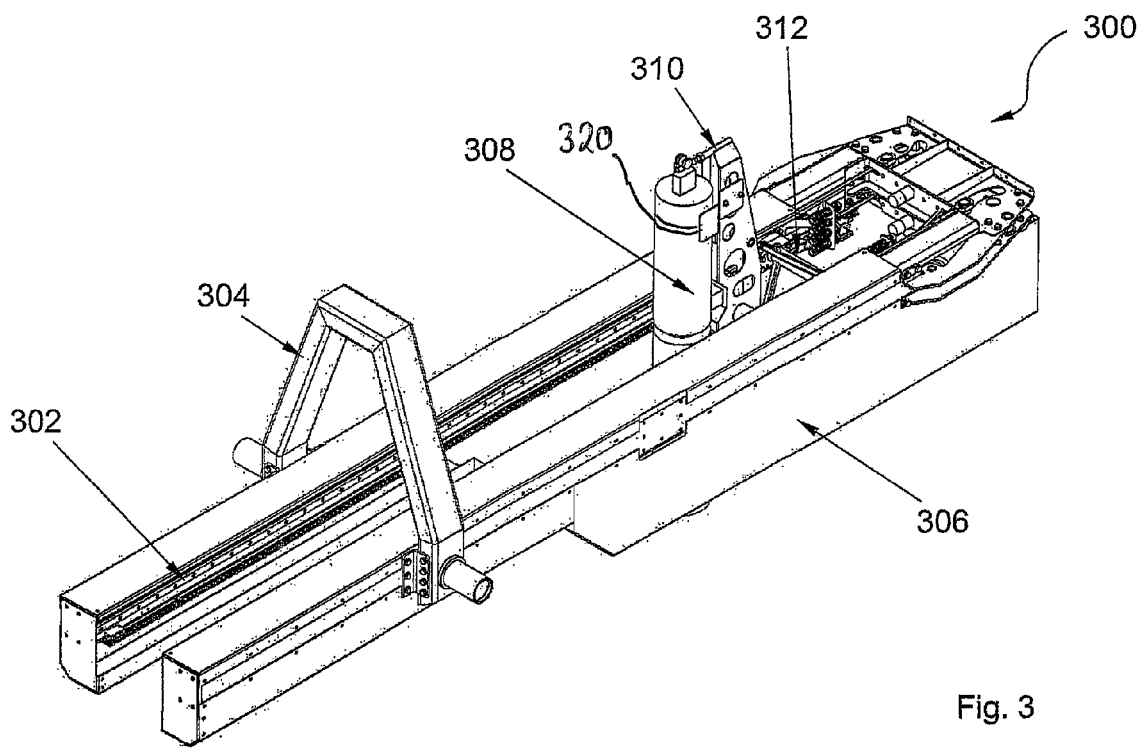
FIG. 3 illustrates a three-dimensional view of a device for investigating a test body according to an exemplary embodiment of the invention.

The illustration in the drawing is schematically.

In the following, referring to FIG. 1, a device 100 for investigating an acceleration behaviour of a test body 102 according to an exemplary embodiment of the invention will be described.

The test body 102 is indicated only schematically in FIG. 1 and is a passenger seat on which a crash test dummy is fastened by a seat belt.

The device 100 comprises a mounting unit 106 for fixedly mounting the test body 102 so that the entire acceleration experiment is performed end-to-end with the test body 102 being rigidly coupled to the mounting unit 106. Particularly, a male thread 109 of threaded protrusion 108 of the test body 102 is shaped and dimensioned to fit to a female threaded recess 110 of the mounting unit 102. Threaded protrusion 108 and threaded recess 110 are fixedly connected to one another by screwing to form a secure screw connection (see detail 150 depicted in FIG. 1).

A linear electric motor 112 is provided and directly coupled electrically with the mounting unit 106 for mechanically driving the mounting unit 106 and the test body 102 permanently mounted thereon.

A control unit 114 (which can be a central processing unit, CPU, or a microprocessor) is provided and is adapted for controlling the linear electric motor 112 to accelerate the test body 102 mounted on the mounting unit 106 in accordance with a desired motion pattern.

FIG. 1 shows, in solid lines, the test body 102 in an operation mode in which it is fastened or assembled at the mounting unit 106 and in which test body 102 and mounting unit 106 stand still. In dotted or dashed lines, FIG. 1 shows the test body 102 after being accelerated together with the mounting unit 106. A spatially fixed block 118 may force a sudden stop of the moving mounting unit 106 together with the test body 102 (see arrow 116 indicating a motion direction before the sudden stop) at a position at which the mounting unit 106 intentionally collides with the spatially fixed block 118.

A length, L, along which the mounting unit 106 may be moved together with the test body 102 is 1000 mm in the embodiment of FIG. 1.

The mounting unit 106 is adapted for substitutably or detachably mounting different test bodies 102. However, if a test body 102 is fixedly connected to the mounting unit 106, it remains fixed for the entire investigation.

The control unit 114 is adapted for controlling the linear drive motor 112 to accelerate the test body 102 in accordance with a predefined trapezoidal velocity profile as the one shown in FIG. 2 which will be described below in more detail.

After the mounting unit 106 and the test body 102 have been collectively stopped by the block 118, the behaviour of the test body 102 under the exerted forces during the sudden stop (which may simulate a traffic accident) may be analyzed.

The mounting unit 106 is mounted on a support 122 (which may also be denoted as a stator, since it remains spatially fixed) which comprises a guide rail 124 along which the mounting unit 106 is movable along a predefined trajectory of the length L.

A measurement unit 126 adapted to perform a longimetry measurement of the test body 102 mounted on the mounting unit 106 is provided for measuring data indicative of a motion of the test body 102 mounted on the mounting unit 106 and for supplying the measurement data to the control unit 114 as a basis for controlling the linear drive motor 122.

Furthermore, a camera 128 (for instance a video camera, a CCD camera, a CMOS camera or the like) is provided for measuring or capturing data indicative of the behaviour of the test body 102 during the applied motion pattern. Corresponding data may be supplied to the control unit 114 for evaluation. The control unit 114 may also have a capability of evaluating the image data to calculate output data.

A user interface 130 is provided which is in bidirectional (or unidirectional) communication with the control unit 114 and which allows a user to define control commands for driving the device 100 and for receiving data indicative of a result of the investigation of the device 100.

It is noted that all aspects mentioned in the embodiment of FIG. 7 (particularly all aspects related to a counterweight and its operation, the mounting on a robot, the configuration of an electric drive unit) can be implemented in the embodiment of FIG. 1 as well.

In the following, some basic recognitions of the present inventor will be explained based on which exemplary embodiments of the invention have been developed.

According to an exemplary embodiment of the invention, a device for performing vehicle component tests may be provided.

The European commission has issued a directive for safety of pedestrians. This directive has the goal to reduce the number of pedestrians killed or injured in traffic by performing modifications of the construction in the front region of vehicles. According to legal regulations, new types of vehicles will only be approved when having passed a number of pedestrian protection tests successfully. This may particularly include tests regarding an upper leg collision with a vehicle or the collision of a hip region with a front edge of the vehicle.

The US National Highway Traffic Safety Administration issues Federal Motor Vehicle Safety Standards (FMVSS) and Regulations to which manufacturers of motor vehicle and equipment items must conform and certify compliance. These Federal safety standards are regulations written in terms of minimum safety performance requirements for motor vehicles or items of motor vehicle equipment. These requirements are specified in such a manner "that the public is protected against unreasonable risk of crashes occurring as a result of the design, construction, or performance of motor vehicles and is also protected against unreasonable risk of death or injury in the event crashes do occur." Occupant protection is part of standards such as the FMVSS 201 (interior impact) and following standards. European standards and other national regulations for occupant protection are EG 74/60, ECE R21, JIS (Japan).

According to an exemplary embodiment of the invention, a device for execution of tests, among others acceleration behaviour and crash tests, for pedestrian protection and protection of occupants may be provided, particularly for simulating a collision of pedestrians or occupants with a vehicle structure. For carrying out such tests, specific test bodies may be analyzed. This may have the goal to guide the test bodies to a sufficiently accurate velocity and then to initiate a guided deceleration in order to obtain comparable and meaningful data allowing to decide whether a vehicle under test fulfils specific requirements. Apart from crash tests, other applications are possible such as analysis of a behaviour of a test body impacted by a force such as a passenger seat-crash test dummy arrangement for whiplash analysis.

In contrast to conventional apparatuses in which test bodies are accelerated using pneumatic or hydraulic cylinders for regulating the test velocity during the acceleration of the test body, exemplary embodiments of the invention implement linear electric motors which accelerate the test body in a controlled or regulated manner along a certain length to a corresponding test velocity. During the acceleration phase, the increase of the velocity may be continuously monitored by a length measurement system. The signal of the length measurement system can be detected by a software and can be evaluated. The software may supply, via a servo regulator, the linear electric motors with corresponding electricity. By taking this measure, it may be possible to carry out the acceleration of the test body in accordance with a definable trapezoidal motion profile, which can be adapted to the different tests.

FIG. 2 shows a diagram 200 having an abscissa 202 along which the time is plotted. Along an ordinate 204, the velocity is plotted. A trapezoidal velocity profile is shown as a curve 206. The time axis 202 is correlated with different operation states of a device according to an exemplary embodiment of the invention, in which a mounting unit 106 is shown which is connected to a test body 102 which is, during a plateau phase of the curve 206, guided with a constant velocity together with the mounting unit 106 when sliding along a guide rail 124.

One or more (electric) drive units may be mounted on a carrier which, in turn, by means of struts or bars, can be connected with an impact carrier in a certain distance.

FIG. 3 shows a device 300 according to an exemplary embodiment of the invention showing a guide rail 302, a front connection member 304, a side cover or energy chain guide 306, a lower leg impactor 308, 10 an impactor carrier 310 and a drive unit 312.

The device 300 is provided on each side with precision guides 302. For the various test bodies 308, the device 300 can be reassembled if desired fast and easily, by substituting the impact carrier 310 by another mounting unit.

The test body 308 is fixedly connected to the carrier 310 by bent metal stripes 320 which clamp the test body 308 against the carrier 310. This rigid connection between the test body 308 and the carrier 310 is maintained during the entire motion of the test body 308 and the carrier 310.

Figure 4:
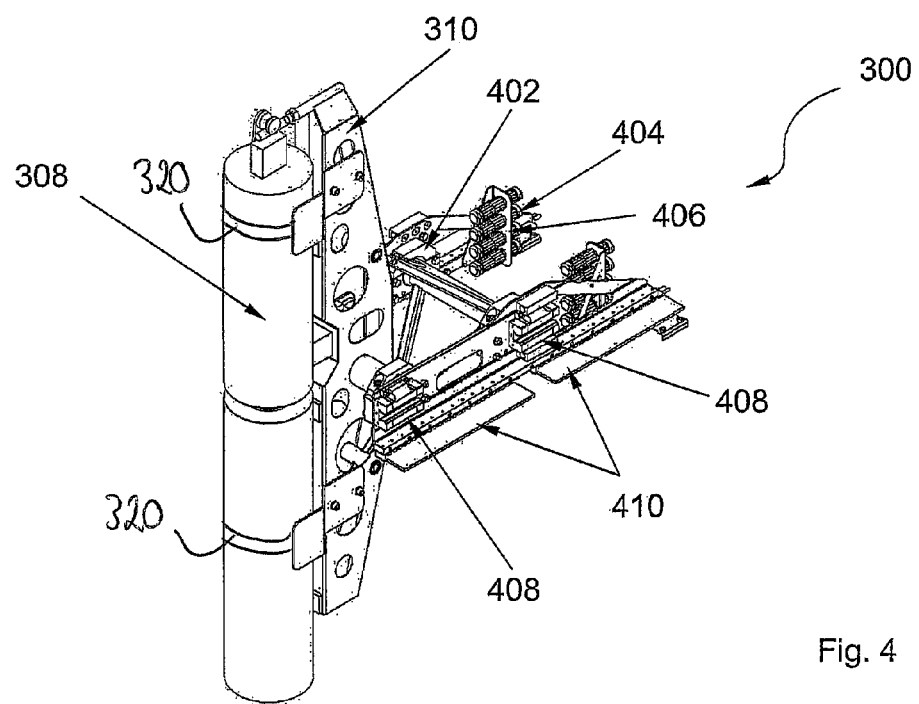
FIG. 4 is a detailed view of a portion of the device of FIG. 3.

FIG. 4 shows the device 300 in further detail.

FIG. 4 shows the impactor carrier 310 on which the lower leg impactor 308 or any other test body is mounted. An impactor clamp is denoted with reference numeral 402. Furthermore, plug connections 404 for sensor cables are shown as well as plug connections 406 for load current cables. A linear guide wagon 408 is shown as well as an ironless electric linear motor 410.

It is noted that all aspects mentioned in the embodiment of FIG. 7 (particularly all aspects related to a counterweight and its operation, the mounting on a robot, the configuration of an electric drive unit) can be implemented in the embodiment of FIG. 3 and FIG. 4 as well.

An embodiment of the invention implements an electro linear motor which may accelerate a horizontal carriage in a controlled manner or in a regulated manner over a predetermined length to a desired test velocity. During the acceleration, the increase of the velocity may be continuously monitored via a length measurement system. A signal of the length measurement system can be determined by a software and may be evaluated. Such a software may comprise one or more servo regulators which may provide the electro linear motor or motors in a corresponding manner with electricity. Consequently, it is possible to carry out the acceleration of a test body in accordance with a predefined velocity profile which can be specifically adapted to a specific application.

FIG. 5 and FIG. 6 show a device 500 for investigating a test body (or test bodies) 502, 506 for instance for a whiplash application according to an exemplary embodiment of the invention.

Exemplary fields of application of the device 500 shown in FIG. 5 and FIG. 6 are front protection applications, child seat tests, tie-down tests (save fastening of a load) or the retracing of real accidents in a laboratory. Test bodies tested using a device 500 may not only be vehicle seats, but also automotive components such as a portion of the cockpit of a vehicle or a center console.

FIG. 5 shows the device 100 for a whiplash application. In this embodiment, the test body is a passenger seat 502 which is rigidly mounted to a mounting unit by screw connections in a section 504. In other words, the passenger seat 502 is mounted to the mounting unit in the same manner as the test body 502 would be mounted in a vehicle in a passenger cabin. A crash test dummy 506 is positioned on the passenger seat 502 and is firmly connected thereto by fastened seat belts 508. With the embodiment of FIG. 5 and FIG. 6, an investigation of the behaviour of the passenger seat 502 with the crash test dummy 506 attached thereto can be investigated. For this purpose, a specific velocity profile is applied to the test body 502 and the crash test dummy 506 which are mounted to the mounting unit in a region 504. Reference numerals 118 indicate front and rear safety stop bumps.

A horizontal carriage or slide is denoted with reference numeral 602. Linear guide rails 604 are shown as well. Reference numeral 606 shows primary parts of electro linear motors which cooperate with secondary parts 608 of the linear motors. A machine base or machine bed 610 is shown in FIG. 6 as well.

During a whiplash experiment, the test body 502 with the crash test dummy 506 mounted thereto may be moved along a direction 512, wherein the components are first accelerated and then, close to the end of the guide rail 604, are suddenly decelerated to simulate an accident. Due to inertia, a head portion of the crash test dummy 506 connected to a torso portion of the crash test dummy 506 via a spring 514 will first move to the front and subsequently move to the back. Such a force sequence may cause whiplash when subjected to a human passenger. Hence, the properties of the head piece of the passenger seat 502 may be tested in the scenario of such a simulated accident.

As can be taken from FIG. 5 and FIG. 6, the primary pieces 606 of the electric linear motor are rigidly coupled with the horizontal carriage 602. The secondary pieces 608 of the electric linear motor are rigidly screwed to the machine bed 610. The machine bed 610 is provided with linear guides via which the horizontal carriage 602 can perform a horizontal linear motion, exclusively driven by the electric linear motors.

In the following, some advantages will be mentioned which can be achieved with a device according to an exemplary embodiment of the invention.

One advantage is that such an apparatus is capable of adjusting the regulated velocity with which the electric drive accelerates the mounting unit with an accuracy of +/−0.05 km/h or more. In the field of pedestrian and occupant protection, tests with at least five different test bodies with dozens of different weights and angles may be required. This may require to define the desired velocity profile for each test, and the apparatus will then be regulated automatically. In contrast to this, in conventional apparatuses, a complex determination of the required velocity which is defined by a pressure generation has to be defined which is time consuming. In an embodiment, it may be sufficient to define a desired acceleration or deceleration profile, then the system may be operated in a self-acting manner to execute such a target sequence.

Furthermore, test matrix determination and calibration tests may be dispensable according to exemplary embodiments of the invention. Conventional test apparatuses are operated pneumatically or hydraulically. The desired test velocities must therefore be determined on the basis of a test matrix and calibration tests. Such a test matrix may be a table constructed based on tests which describe the correlation between desired velocity, test body, and test mass. Five test bodies required for specific test sequences each represent a human body part (three heads, one hip, one leg). The three heads may have different masses and/or dimensions and may be accelerated to 35 km/h or 40 km/h. The velocity and the mass of a hip impactor may result from the construction of the vehicle to be tested. Thus, the device front may be measured in accordance with a test procedure, and test data are evaluated therefrom.

The test mass may be in a range between 9 kg and 14 kg, and the velocity may be in a range between 16 km/h and 40 km/h. Furthermore, the temperature in the examination space and the humidity in the examination space may have to be taken into account. According to legal provisions, the tests should be carried out in a range between 18° C. and 26° C. and at between 10% and 70% humidity. The different temperatures and humidity values may result conventionally from different filling properties of a pressure container and correspondingly different test velocities. Thus, these two components also have to be implemented in the test matrix in a conventional system. This may result in a plurality of different test constellations which have to be carried out after operation and maintenance of the acceleration device. This may require between the performance of 400 to 700 tests.

Calibration tests may be tests which are required in order to test the respective shot device. In this context, one or more tests have to be carried out in order to test the matrix and, if necessary, to correct it. This may also ensure to achieve the desired velocity in an accepted field of tolerances.

Erroneous tests (for example tests out of a range of acceptable velocities) should be prevented since they are very expensive due to high efforts required for preparing the vehicle and the test bodies. Furthermore, due to the implantation of finite element simulations in the field of pedestrian and occupant protection development it has become even more important to provide a very good agreement with the test parameters. This also includes that the velocity tolerances have to be considered.

Furthermore, exemplary embodiments of the invention allow to perform more precise tests and to achieve more precise results. While the development of pneumatic and hydraulic apparatuses is more or less unchanged, finite element simulation in automotive development has become so important that many tests are only carried out in order to confirm simulation results. For this purpose, it is required to have very precise testing conditions yielding results which are properly comparable with FE data. At the regulated velocity, a sensor verifies in frequencies whether the velocity is correct, as long as the test body is in acceleration. In conventional apparatuses, a pressure can be generated up to a value determined by a test matrix, and the test body may be shot from a shot device. At the point of time of the shot, no regulating management is possible any longer. The user has to rely upon the fact that the velocity has been correct.

Furthermore, exemplary embodiments of the invention do not show a strong dependency of the room temperature which is a problem with conventional apparatuses in which, for instance, sealings and operation fluid have to adjusted to a respective velocity.

Conventional test systems are very sensitive regarding temperature and humidity in the test environment. However, according to exemplary embodiments of the invention, such a temperature dependence is efficiently suppressed, since the velocity is regulated in real time using an electric drive unit.

Furthermore, it may be possible to carry out the tests in a faster manner. The electric drive may be particularly advantageously in this respect, because when the test body carrier drives back immediately after the end of the tests into the initial position, no time consuming piston back drive procedures are required which conventionally has to be carried out manually. Such a conventional need for a manual back transportation is also a source of danger and injury because a user has to be located close to the apparatus.

Moreover, the electric drive provides the opportunity at each time to position the device with a precision of millimeters and less, for instance in order to capture a test body or to detect a target (test body hit point) at the device under examination with high precision.

Furthermore, a waiting time for generating a pressure is eliminated, which is required at conventional hydraulic or pneumatic cylinders. This may allow to safe up to 15 minutes or more per test. This may correspond with a reduction of the time of a complete test of 15% or more.

Moreover, reassembling can be performed with low effort in a fast time. The five test bodies which are frequently used for pedestrian and occupant protection tests can be mounted using different mounting units to be assembled and disassembled on the apparatus. In such a conventional case, the devices cannot be mounted by one person alone, and the time consumption for the reassembly may be in the order of magnitude between 1 hour and 8 hours. In contrast to this, embodiments of the invention are designed in such a manner that there is only one device and there are only three carriers for the test bodies which can be exchanged in an easy manner because they have to be only fastened with a number of (for instance 8) screws or any other fastening elements. This screw connection between mounting unit and a support of the device should not be confused with a screw connection (or any other unreleasable connection) between mounting unit and test body. The time for reassembly may be 15 minutes or less.

Beyond this, a high degree of security for operating a device according to an exemplary embodiment of the invention may be achieved. Pneumatic and hydraulic apparatuses work with different pressure containers with work pressures between 2 bar and 11 bar. The pressure containers are a source of danger, and thus the security provisions during and after the test have to be strict. Such a risk does not occur according to exemplary embodiments of the invention.

Furthermore, exemplary embodiments of the invention may be operated in an easy manner. The operation of pneumatic and hydraulic apparatuses requires high skill of users. According to an exemplary embodiment of the invention, a large amount of such knowledge is no longer required for managing or handling the apparatus. The control of the device can be performed via menus (supported with images, videos and/or error analysis). Furthermore, a full automatic capturing and evaluating of test data may be integrated in the device.

Moreover, the maintenance efforts may be very small. Due to the low-friction or frictionless drive, the high effort when changing cylinder pistons and sealing rings may be eliminated.

Since the device according to an exemplary embodiment of the invention can be operated immediately and provides reliable test results, a high performance can be combined with a short waiting time between different ones of a sequence of tests. The operation of the device can be performed by one person, regarding tests and reassembly. Thus, the skills and man power required for operating the device are relatively low. Moreover, expensive work media such as nitrogen or hydraulic oil can be avoided.

FIG. 7 shows a device 700 for investigating a collision between a test body 102, in the present example a test body simulating a head of a human being, and a spatially fixed physical structure (not shown) according to another exemplary embodiment.

Also in this embodiment, the mounting unit 106 and the test body 102 are exclusively driven by an electric drive unit which is realized by a plurality of linear motors, for instance by four linear motors in the described embodiment. Reference numeral 702 shows the secondary portions of the linear motors. The four electric linear motors are operated parallel to one another in a synchronized manner. For this reason, a control unit (not shown in FIG. 7) controls the four linear motors based on a software routine so as to synchronize their operation in time. In other words, the four linear motors are operated to be switched parallel in time. The four linear motors are connected in series to one another. The provision of four linear motors results from the fact that for the acceleration of heavy objects, the use of for instance only one or two linear motor may not be sufficient when pneumatic or hydraulic acceleration systems shall be completely omitted, as in the embodiment shown in FIG. 7 and FIG. 8. Therefore, the described embodiment of the invention overcome the prejudice in the pertinent technical field in which the artisans considered it to be impossible to operate such a device for testing a test body 102 only on the basis of linear motors, without using hydraulic or pneumatic acceleration systems, and nevertheless to obtain the required velocities and forces. However, an arrangement with multiple parallel linear motors as shown in FIG. 7 has solved this long-lasting problem in the art in a very efficient manner. For instance, it is possible to manufacture the device of FIG. 7 with a length (in a direction 116) of for instance 1000 mm or more, and dimensions in directions perpendicularly to this direction 116 of for instance 300 mm×300 mm or more.

Although not shown in the figures, the test body 102 comprises a protrusion or pin with a male thread which is shaped and dimensioned to correspond to a recess with a female thread (not shown) in the mounting unit 106 so that this protrusion 1202 may be threaded into the recess for fixedly holding the test body 102 on the mounting unit 106 by a thread connection.

As can be taken from FIG. 7, the mounting unit 106 is mounted via the guide rails 302 on a support 704 of the device 700. On an opposite side surface of the support 704, as better shown in FIG. 8, a counterweight 706 is mounted which is configured to be mechanically driven upon mechanically driving the mounting unit 106 and the test body 102 mounted thereon along a moving direction 708 which is oppositely oriented with regard to a moving direction 116 of the mounting unit 106 and the test body 102 mounted thereon.

A mass of the counterweight 706 is adjusted to a mass of the test body 102 (in combination with the mounting unit 106) to therefore at least partially equilibrate or balance out forces acting on the support 704 upon accelerating the test body 102 along the direction 116. Therefore, a nearly force-free acceleration may be achieved by the balance mass 706.

A cable pull mechanism 710 is provided as well which comprises a cable inversion member 712 as well as hauling ropes 714. The ropes or cables 714 connect the counterweight 706 with the mounting unit 106 to reverse a force vector acting on the mounting unit 106 and the test body 102 mounted thereon to an inverse force vector acting on the counterweight 706. Therefore, it may be dispensable to provide a separate drive unit for driving the countermass 706, so that also the countermass 706 is indirectly driven by the electric linear motor.

As can be taken best from FIG. 8, a further guide rail 802 is provided for guiding the balance mass 706 along the direction 708.

Furthermore, a robot mounting base 716 is provided as a flange at which a robot (not shown in figures) is to be mounted. The mounting of a very simple robot is possible according to an exemplary embodiment, since the provision of the balance weight 706 allows for a force-free operation of the device 700, so that no disturbing forces are exerted on the robot during the acceleration experiment.

A damper or shock absorber 804 is provided at the counterweight 706 to absorb mechanical forces when the balance mass 706 abuts against a front member 806 of the device 700.

During the entire acceleration phase, the above described screw connection between the test body 102 and the mounting unit 106 keeps the test body 102 rigidly coupled to the mounting unit 106, even when the test body 102 collides with a collision body (not shown) at the end of the guide rails 302. The collision body may be provided independently of the device 700, i.e. may be not mounted thereto.

Although the embodiment of FIG. 7 and FIG. 8 is configured for head collision experiments in an occupant compartment of a vehicle, a similar configuration is possible with an embodiment as shown in FIG. 1, for instance.

Still referring to the embodiment of FIG. 7 and FIG. 8, the use of linear motors allows for a recoilless acceleration due to the motion of the counterweight 706 in the acceleration phase. Consequently, it is possible to use the device 700 in combination with a robot being sensitive regarding vibrations, for instance a six axes robot, thereby allowing for a precise and simple positioning of the device 700 without the danger of deteriorating operation of such a robot.

In order to meet legal requirements regarding passive vehicle safety (see US directive FMVSS 201, European directive ECE R21, etc.) collision experiments have to be performed in an occupant cell of a vehicle in order to protect an occupant regarding injuries resulting from a collision of a head and components within a vehicle. Embodiments of the invention, particularly the embodiment of FIG. 7 and FIG. 8, may be used for such a purpose.

Referring to FIG. 9 to FIG. 12, a complete acceleration sequence will be described for the device 700 shown in FIG. 7.

Diagrams 900, 1000, 1100 and 1200 illustrate a relationship between time (abscissa) and velocity (ordinate) during the experiment.

Figure 9:
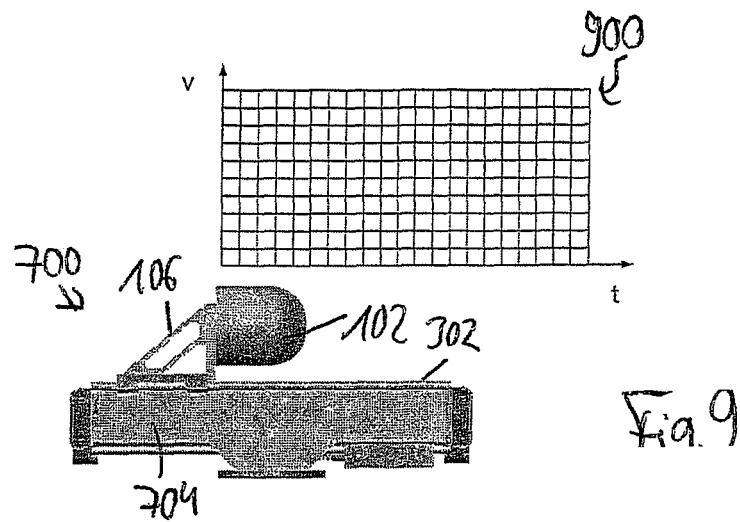
FIG. 9 to FIG. 12 show the device of FIG. 7 and FIG. 8 during four phases of an experiment of investigating a test body.
Figure 10:
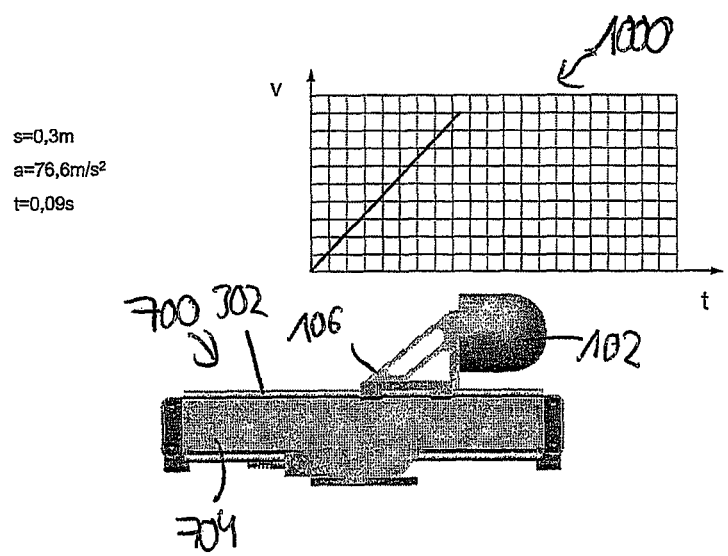
Figure 11:
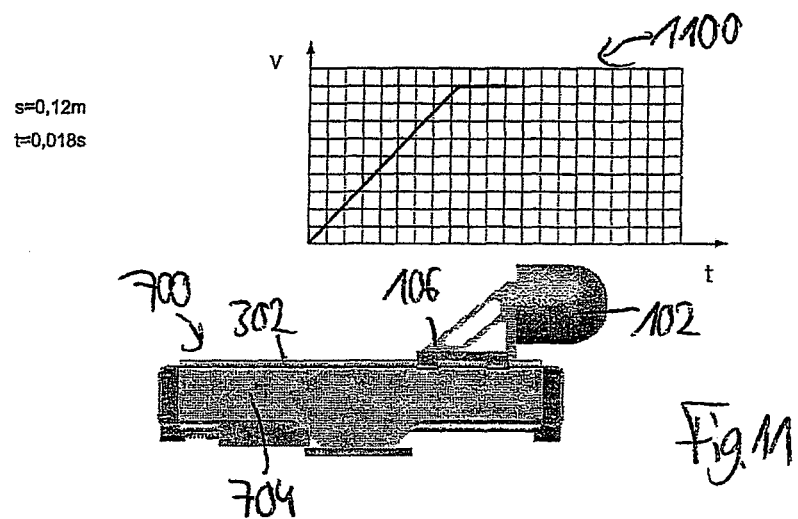
Figure 12:
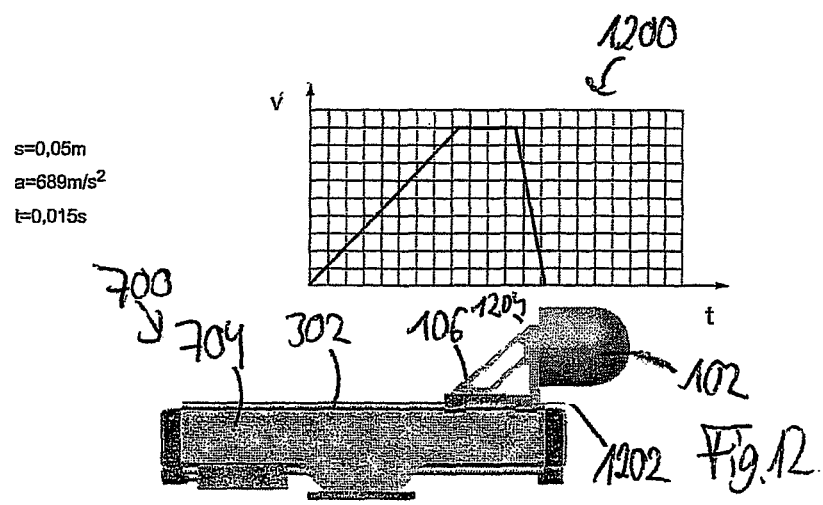

FIG. 9 shows a scenario before accelerating. FIG. 10 shows a scenario during acceleration, wherein a constant acceleration is applied to the test body 102. FIG. 11 shows a situation at which a constant velocity is maintained, and FIG. 12 shows the scenario of a deceleration during which the test body 102 maintains connected to the mounting unit 106 but may be already very close to the collision body (not shown).

FIG. 13 shows a diagram 1300 of an acceleration profile or a velocity profile which can be used, for instance, with the embodiment of FIG. 5 and FIG. 6. A time is plotted along an abscissa 1302. Along a first ordinate 1304, the acceleration is plotted. Along a second ordinate 1306, the velocity is plotted.

FIG. 14 shows a diagram 1400 which is similar to FIG. 13 but shows another acceleration profile.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. A device for investigating a test body, wherein the device comprises
a mounting unit for fixedly mounting the test body during the entire investigation;
an electric drive unit adapted for mechanically driving the mounting unit and the test body mounted thereon;
a control unit adapted for controlling the electric drive unit to accelerate the test body mounted on the mounting unit;
wherein the device is adapted so that the mounting unit and the test body mounted thereon are mechanically driven exclusively by the electric drive unit;
wherein the electric drive unit comprises an electric linear motor;
wherein the electric linear motor comprises a primary part arranged at a static support of the device and a secondary part arranged at the mounting unit to be movable relative to the static support such that the electric linear motor may act directly on the mounting unit;
wherein the electric drive unit comprises at least three electric linear motors operated in parallel to one another in a synchronized manner.

2. The device according to claim 1, wherein the mounting unit is adapted for enabling release of the test body from the mounting unit.

3. The device according to claim 1, wherein the mounting unit is adapted for enabling demounting of the test body from the mounting unit only upon operation of a user-operated demounting tool by a user.

4. The device according to claim 1, wherein the control unit is adapted for controlling the electric drive unit to limit a maximum acceleration or deceleration of the test body mounted on the mounting unit to an absolute value below a predefined acceleration or deceleration threshold value.

5. The device according to claim 1, wherein the control unit is adapted for controlling the electric drive unit to limit a maximum acceleration force or deceleration force of the test body mounted on the mounting unit to an absolute value below a predefined force threshold value.

6. The device according to claim 1, wherein the control unit is adapted for controlling the electric drive unit to accelerate the test body during a first time interval, to regulate a constant velocity of the test body during a second time interval succeeding the first time interval, and to decelerate the test body during a third time interval succeeding the second time interval.

7. The device according to claim 6, wherein the device is adapted so that, exclusively by the electric drive unit, the mounting unit and the test body mounted thereon are accelerated during the first time interval, are moved with the constant velocity during the second time interval, and are decelerated during the third time interval.

8. The device according to claim 1, further comprising:
a carriage on which the mounting unit is fixed such that the carriage, mounting unit and test body are movable along a predefined trajectory.

9. The device according to claim 1, wherein the static support comprises a guide rail on which the mounting unit is movable along the predefined trajectory.

10. The device according to claim 1, comprising a measurement unit adapted for measuring data indicative of a motion of the test body mounted on the mounting unit and for supplying the measurement data to the control unit as a basis for controlling the electric drive unit.

11. The device according to claim 1, comprising an analysis unit adapted for detecting and evaluating test data indicative of a behaviour of the test body during the investigation.

12. The device according to claim 1, comprising a counterweight configured to be mechanically moved upon mechanically driving the mounting unit and the test body mounted thereon, wherein the counterweight is moved along a moving direction which is oriented oppositely with regard to a moving direction of the mounting unit and the test body mounted thereon.

13. The device according to claim 12, wherein a mass of the counterweight equals a mass of the test body mounted on the mounting unit.

14. The device according to claim 12, comprising a force converter mechanically coupling the counterweight with the mounting unit and the test body mounted thereon so that the force converter converts a force acting on the mounting unit and the test body mounted thereon into a converted force acting on the counterweight.

15. The device according to claim 1, comprising a robot mounting base adapted for mounting a robot for spatially moving the device.

16. A method of investigating a test body, wherein the method comprises:
  mechanically driving a mounting unit and a test body, fixedly mounted thereon during the entire investigation, exclusively by an electric drive unit, wherein the electric drive unit comprises at least three electric linear motors;
  controlling the electric drive unit to accelerate the test body mounted on the mounting unit;
  wherein the electric linear motors comprises a primary part arranged at a static support and a secondary part arranged at the mounting unit to be movable relative to the static support such that the electric linear motors may act directly on the mounting unit;
  wherein the at least three electric linear motors operate in parallel to one another in a synchronized manner.

* * * * *